April 21, 1964 E. NOHL ETAL Re. 25,556

FLOOR CLEANING AND POLISHING DEVICE

Original Filed June 18, 1959 2 Sheets-Sheet 1

INVENTORS
EGON NOHL
GERTRUD NOHL
BY Connolly and Hutz
their ATTORNEYS

FLOOR CLEANING AND POLISHING DEVICE

Original Filed June 18, 1959 2 Sheets-Sheet 2

INVENTORS
EGON NOHL
GERTRUD NOHL
BY Connolly and Hutz
ATTORNEYS

United States Patent Office

Re. 25,556
Reissued Apr. 21, 1964

25,556

FLOOR CLEANING AND POLISHING DEVICE

Egon Nohl and Gertrud Nohl, Wiener Neustadt, Austria, assignors to Friedrich Hobiger, Vienna, Austria, and Leopold Hobiger, Vienna, Austria Original No. 3,081,481, dated Mar. 19, 1963, Ser. No. 821,157, June 18, 1959. Application for reissue Oct. 8, 1963, Ser. No. 314,825
Claims priority, application Austria June 25, 1958
5 Claims. (Cl. 15—546)

Figure 1:
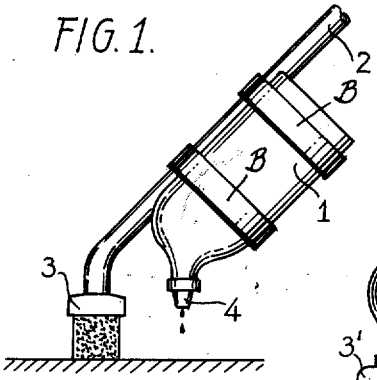

Matter enclosed in heavy brackets [ ] appears in the original patent but forms no part of this reissue specification; matter printed in italics indicates the additions made by reissue.

The present invention relates to a container for the storage delivery and application of liquid floor cleaning and polishing agents.

Known containers of this kind are either fastened to the handle of a mop or another floor cleaning implement by means of clamps or clips or are fixed between the two halves of the handle by means of screws or the like. The cleaning or polishing agent is either dropped on the floor directly through a suitable opening of the container and spread out by the implement or supplied in controllable manner to the distributor of the implement.

Especially, when large surfaces are concerned, as for example in restaurants, offices or hospitals, the charge of the container is soon used up and a repeated filling or replacement with another container is required. The loosening of the clips or screws takes much time and is rather troublesome. The use of elastic bands cannot overcome said inconvenience since they do not guarantee a satisfactory non-twisting and non-sliding support of the container whereby disturbances, or in the case of a container connected with a distributor, damages of the coupling or controlling elements may occur.

A commercial can which, when made of sheet metal, is generally provided with a beaded edge at both ends is clamped in some cases between two noses fixed to the handle or the implement. One of the noses is rigidly attached and the other nose or clamp is held by springs or can be shifted along the handle. Furthermore, there have been used fastening lugs on the can itself in combination with such noses. A container fixed in this manner can be replaced more or less rapidly, but the stability of the mounting is not sufficient in all cases and, above all, complicated and expensive clamps and screws are required for fastening which are easily lost.

It has furthermore been proposed to provide a cylindrical container with notches at both ends which receive the upper or lower end, respectively, of a two-part fork, the base of which is inserted into the handle and the ends of which can be connected by means of sleeves and splints to engage the container. Such an arrangement is, however, very complicated and expensive and the replacement of the container takes much time. Another known container has, at one side along the surface lines, a shallow groove adapted to the rounding of the handle, which groove can only guarantee a secure fastening of the container on the handle with the use of clamps which is quite complicated. In this case, too, the required fastening means are expensive and are easily lost.

The present invention concerns a container which does not possess the aforesaid disadvantages. The wall of the container is provided with a groove, the surfaces of which encircle the handle of the implement by at least 180° of its circumference whereby a secure and solid fastening is produced. When the encircling angle amounts to 180° only, elastic bands or the like that can easily be slipped over suffice to secure the handle in the groove. Safety means of this kind can, however, be dispensed with when the encircling angle is enlarged so that the edges of the groove have a distance from one another that is smaller than the inner diameter of the groove. In this case it is of advantage to use an elastic plastic material such as a thermoplastic material for making the container, since the contracted inserting slit of the groove can then be elastically enlarged when the handle is introduced and the walls of the groove encircle the handle with tension. In order to improve said spring action, the edges of the groove can project,, according to a further feature of the invention, from the wall of the container in the form of ribs.

The cross section of the groove is generally adapted to the cross section of the handle and has a circular shape. In many cases with the prior art, it is necessary to provide the handle or the container with guiding elements in the form of perforated fishplates or the like for the guidance of a drawing means acting on a valve disposed on the container or the head of the implement for regulating the issue of the liquid. Expensive and complicated guiding elements of this kind can be dispensed with according to the invention in simple manner by means of a groove having a shape such that a free channel-like space is provided for between the handle and the wall of the container, in which space the drawing means are guided. In principle, a non-circular cross section contracting in V-shaped manner towards the inserting slit may be used in all cases where certain differences in diameter of the handles used shall be compensated.

Figure 2:
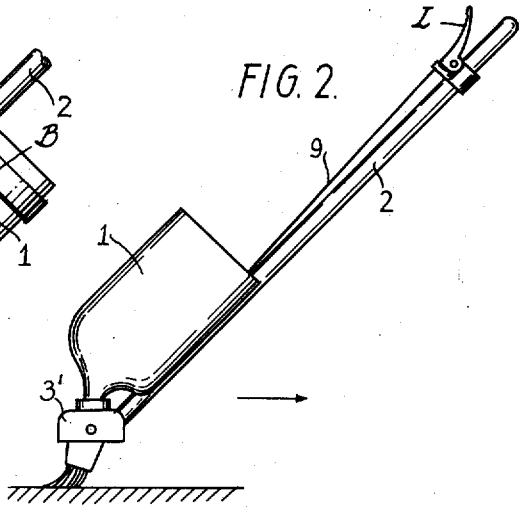
Figure 2A:
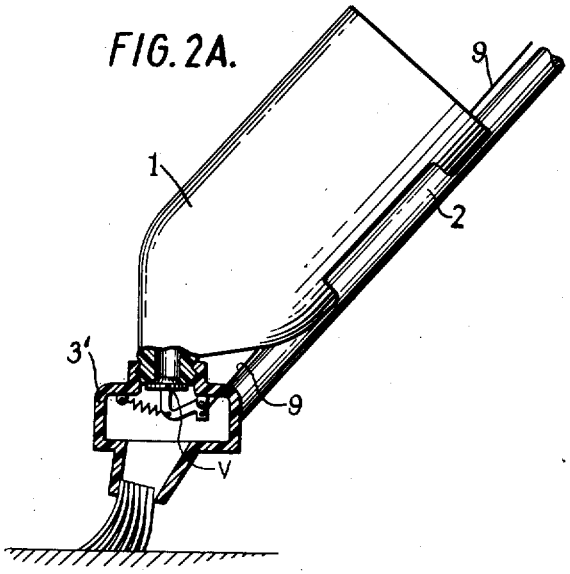

The wall of the container may be provided with the groove over the whole length or only over a part of the shell (FIG. 2A). In the latter case, projections exist with respect to the unshaped wall of the container. It is also possible to weld lugs or ribs on an even-walled container which then form the said projections.

At the transition area where the shell of the prior art container meets the container bottom, difficulties may arise insofar as the bottom, which has a right-angled position with respect to the shell, dooes not give to the desired extent in the elastic deformation of the container shell when inserting the handle. According to the present invention, this difficulty is overcome by a bottom that is vaulted and/or corrugated at least in the area of the outlet of the groove.

Figure 3:
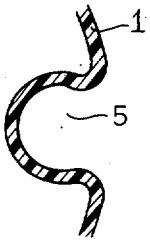
Figure 4:
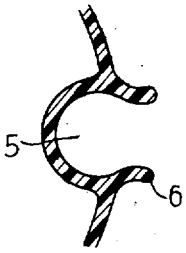
Figure 5:
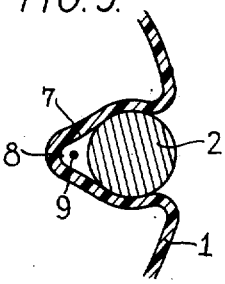
Figure 6:
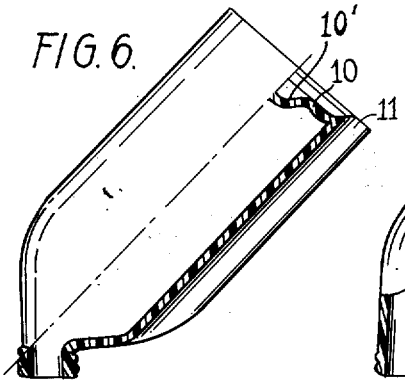
Figure 7:
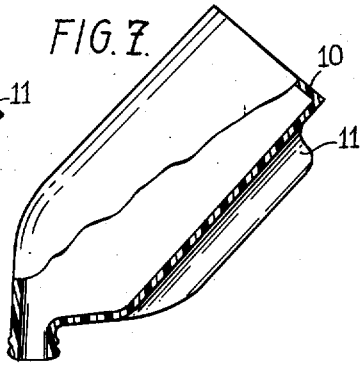

The accompanying drawings serve to illustrate the invention. FIGURE 1 shows a container according to the invention which is fastened to the handle or shaft of an implement in a position suitable for dropping the liquid on the floor. FIGURE 2 shows the container in a suitable position for feeding a distributor. FIG. 2A shows the drawing element connected to a control valve for the container and also an embodiment wherein gripping grooves are provided at each end of the container. FIGURES 3–5 are cross sections of various groove profiles, and FIGURES 6 and 7 represent the longitudinal sections of two different embodiments of the container.

The container 1 is replaceably fixed to the handle 2 of a floor cleaning or polishing implement. The liquid present in the container is either dropped directly on the floor by an appropriate stopper 4 (FIGURE 1) or supplied in controllable manner to the distributor 3 of the implement (FIGURE 2) by which distributor it is then applied to the floor.

The container (a bottle or the like) is fastened to the handle according to the invention by means of a groove 5 provided for in the wall of the container. The borders of the groove may have a distance from one another corresponding to the inner diameter of the groove (encircling angle of 180°). In this case simple elastic slip-over bands B or the like guarantee a solid encircling of the handle. The borders of the groove may likewise have a smaller distance from one another (encircling angle of more than 180°) in which case the container is held on the handle without additional fastening means by friction and clamping of the elastic walls, particularly when the container is made from an elastic plastic material.

FIGURE 3 shows the simplest shape of the cross section of the groove with slightly rounded edges. In the embodiment shown in FIGURE 4, the borders 6 have the form of projecting ribs that provide for an improved elasticity of the borders of the groove when inserting the handle, even in the case of a less elastic container material. FIGURE 5 illustrates the cross section of a groove having a shape such that a free channel 8 is provided for between the handle and the wall of the container, which channel serves for guiding the drawing cable 9 which extends from a valve V (FIG. 2A) for the container disposed at head 3' (FIG. 2A) to a hand lever L at the upper end of handle 2.

When the groove extends to the transition area between the container shell and the container bottom, care must be taken that the bottom 10 is rendered elastic by means of corrugations and/or vaults 10', at least around the outlet 11 of the groove (FIGURE 6). This latter precaution can be dispensed with in simple manner as shown in FIGURE 7 by a groove that does not extend to the bottom of the container. The wall of the container between the end of the groove and the bottom is then set back by the depth of the groove.

The container according to the invention, particularly when made of a thermoplastic material, can be produced in simple manner and without great expenses and guarantees by its fastening means a rapid replacement with one manipulation and a solid fixation to the handle of a mop or the like without additional fixing elements.

Since, with an encircling angle of more than 180°, the handle is always clamped into the groove by the elastic borders thereof and the cross section of the groove is advantageously smaller than the cross section of a standard handle, certain differences in the diameter of the handles used have in general no particular influence on the fixation of the container to the handle.

By a groove, the cross section of which has a particular shape, for example a groove with a round bottom and side walls converging in V-shaped manner towards the borders (in reverse sense to FIGURE 5) differences in diameter of several millimeters can be easily compensated. The fastening of the container to extremely thin handles is likewise not difficult when a piece of cloth or the like is inserted into the groove before pressing in the handle.

We claim:

*1.* A cleaning and polishing device comprising, in combination, an elongated handle shaft, a cleaning and polishing element attached to said handle shaft at one end, an externally grooved container formed wholly of resilient material adapted for wedging attachment to said handle shaft, a groove in said container arranged in an axial direction and resiliently adapted for encircling said handle shaft over an arc greater than 180° of its circumference, said container having a vaulted bottom, and means for controlling flow from said grooved container.

*2. A cleaning and polishing device comprising, in combination,*

*an elongated handle shaft with a cleaning and polishing element attached to one end of said handle shaft,*

*a container of resilient material and having a cross-section substantially symmetrical relative to its longitudinal axis,*

*said container having an external groove disposed substantially axially for at least a part of its axial length for wedging attachment of said container to said handle shaft and resiliently and frictionally encircling said handle shaft over an arc of at least 180° of its circumference, and*

*said groove extending axially along the periphery of said container and within an imaginary body enveloping closely said container, to be disposed within said substantially symmetrical cross-section of said container.*

*3. The device, as set forth in claim 2, wherein*

*said groove terminates in said container short of its bottom.*

*4. The device, as set forth in claim 2, which includes*

*a piece of material inserted into said groove, in order to receive therein still resiliently and frictionally a handle shaft of appreciably smaller cross-section than that of said groove.*

*5. A cleaning and polishing device comprising, in combination,*

*an elongated handle shaft with*

*a cleaning and polishing element attached to one end of said device,*

*a container of resilient material and having a cross-section substantially symmetrical relative to its longitudinal axis,*

*said container having an external groove disposed substantially axially for at least a part of its axial length for wedging attachment of said container to said handle shaft and resiliently and frictionally encircling said handle shaft over an arc of at least 180° of its circumference, and*

*said groove extending axially along the periphery of said container and within an imaginary body enveloping closely said container, to be disposed within said substantially symmetrical cross-section of said container.*

References Cited in the file of this patent or the original patent

UNITED STATES PATENTS

| | | |
|---|---|---|
| 741,432 | Allen | Oct. 13, 1903 |
| 809,991 | Sheridan | Jan. 16, 1906 |
| 882,934 | Egger | Mar. 24, 1908 |
| 1,071,408 | Evans | Aug. 26, 1913 |
| 1,264,707 | Stewart | Apr. 30, 1918 |
| 2,099,055 | Ferngren | Nov. 16, 1937 |
| 2,307,858 | Rufo | Jan. 12, 1943 |
| 2,618,799 | Barbato | Nov. 25, 1952 |
| 2,646,021 | Rice | July 21, 1953 |
| 2,754,029 | Maxcey | July 10, 1956 |
| 2,789,300 | Beller | Apr. 23, 1957 |

FOREIGN PATENTS

| | | |
|---|---|---|
| 6,564 | Great Britain | May 5, 1894 |
| 53,053 | Switzerland | Oct. 1, 1910 |
| 337,966 | Great Britain | Nov. 8, 1935 |
| 731,785 | France | May 31, 1932 |